United States Patent [19]

Ellis

[11] 4,151,364

[45] Apr. 24, 1979

[54] ELECTRICAL CONNECTORS AND METHODS OF CONNECTING ELECTRICAL CONDUCTORS

[76] Inventor: J. Scott Ellis, 1031 Shadow Brook Dr., San Jose, Calif.

[21] Appl. No.: 727,669

[22] Filed: Sep. 29, 1976

[51] Int. Cl.² .................................................. H01R 5/10
[52] U.S. Cl. ..................................... 174/84 C; 29/628; 174/DIG. 8
[58] Field of Search ............ 174/84 R, 84 C, DIG. 8; 29/628; 339/DIG. 1

[56] References Cited

U.S. PATENT DOCUMENTS

| | | | |
|---|---|---|---|
| 2,855,581 | 10/1958 | Freedom | 174/84 C |
| 2,992,457 | 7/1961 | Harrison | 174/DIG. 8 |
| 3,035,113 | 5/1962 | Danchuk | 174/DIG. 8 |
| 3,159,513 | 12/1964 | Baier | 174/DIG. 8 |
| 3,193,792 | 7/1965 | Shea, Jr. | 339/DIG. 1 |
| 3,213,186 | 10/1965 | Raila et al. | 174/84 C |
| 3,538,240 | 11/1970 | Sherlock | 174/DIG. 8 |
| 3,717,717 | 2/1973 | Cunningham et al. | 174/DIG. 8 |

FOREIGN PATENT DOCUMENTS

2534385  3/1976  Fed. Rep. of Germany .... 174/DIG. 8

Primary Examiner—Laramie E. Askin
Assistant Examiner—E. F. Borchelt
Attorney, Agent, or Firm—Roylance, Abrams, Berdo & Farley

[57] ABSTRACT

An electrical connector device for electrical conductors comprising a conducting ferrule receiving the leads from two insulated conductors and a heat shrinkable plastic tube surrounding the ferrule and extending past the ends of the ferrule, the tube having a normally dry, heat activated adhesive coated on the interior thereof, which tube is heated and thereby shrunk and hermetically bonded to the exterior of the ferrule and the insulation on the conductors. In certain situations an additional insulating layer is interposed between the tube and the ferrule. An electrical conductor, usable in the electrical connector device, comprises an insulated electrical wire, a ferrule receiving a lead from the wire, and a heat shrinkable plastic tube having normally dry, heat activated adhesive coated on the interior thereof, which tube is heated and thereby shrunk and hermetically bonded to both the ferrule and the wire insulation.

15 Claims, 10 Drawing Figures

ELECTRICAL CONNECTORS AND METHODS OF CONNECTING ELECTRICAL CONDUCTORS

The present invention relates to electrical connectors for insulated electrical conductors and methods of connecting these electrical conductors. More specifically, the present invention relates to connecting electrical conductors by means of a metallic ferrule and a heat shrinkable plastic tube having normally dry, heat activated adhesive coated on the interior thereof for securing the electrical conductors to the ferrule and for providing a moisture seal therebetween.

There have been numerous attempts in the prior art to provide an effective electrical connector for insulated electrical conductors; however, these prior art attempts have numerous deficiencies. Many of them require a complicated sequence of steps in order to make the connection which is time consuming and which requires a certain degree of skill and manipulative expertise. Also, many of the prior art devices are bulky and heavy which results in difficulty in maneuvering of the electrical connector in the usually cramped area in which it is used. Of even more significance many of the prior art devices do not provide adequate strain relief so that flexing, pulling and twisting of the electrical conductors results in failure of the electrical connector. Of similar importance is the failure of the prior art devices to provide adequate moisture sealing of the connection which results in failure of the connection and the requirement of replacing such connection.

In addition, many of the prior art devices require a very accurate location of the insulation in relation to the connection which, if not so provided, results in poor insulation protection and high incidence of electrical failure. Finally, many of the prior art devices that provide some moisture seal and strain relief are difficult or impossible to disconnect easily, so disconnection is usually accomplished by severing of the electrical conductor, resulting in waste.

Accordingly, it is an object of the present invention to provide an electrical connector which is quick and easy to install without a complicated sequence of steps.

Another object is to provide an electrical connector having a low profile and a light weight.

Another object is to provide an electrical connector which is highly strain relieved and can resist flexing, pulling and twisting of the electrical conductors without failure of the connection.

Another object is to provide an electrical connector which is hermetically sealed to prevent moisture contamination of the connection and to prevent failure therefrom.

Another object is to provide an electrical connector which is highly insulated and does not require a high degree of accuracy with regard to aligning of the insulation protection over the connector.

Another object is to provide an electrical connector which does not require a special crimping tool.

Another object is to provide an electrical connector which is easy to disconnect and whose conductors are reusable.

Another object is to provide methods of connecting electrical conductors which are simple and require little time or skill to accomplish.

SUMMARY OF THE INVENTION

The foregoing objects are attained by providing a device for connecting two insulated electrical conductors, each of the conductors including a conducting portion surrounded by an insulating portion with the conducting portion having a lead extending past the end of the insulating portion, wherein the combination comprises a conductive member having a bore at each end and an exterior surface, each of the leads being at least partially receiveable in one of said bores in a conducting relationship with said conductive member; and means, coupled to said conductive member exterior surface, for securing the conductors to said conductive member, said means comprising a first heat shrinkable plastic tubular portion extending past one end of said conductive member and receiving therein a part of the insulating portion of the first electrical conductor, and normally dry, heat activated adhesive coated on the interior surface of said first tubular portion, said means further comprising a second heat shrinkable plastic tubular portion extending past the other end of said conductive member and receiving therein a part of the insulating portion of the second electrical conductor, and normally dry, heat activated adhesive coated on the interior surface of said second tubular portion, each of said tubular portions initially having an inner diameter greater than the outer diameter of the part of the insulating portion received therein and then being coupled in a sealing relationship with the insulating portion of a respective one of the electrical conductors by heating said tubular portion to thereby shrink said tubular portion into an engaging relationship with the insulating portion and to thereby activate said adhesive coated thereon to hermetically bond the tubular portion to the insulating portion.

Figure 1:
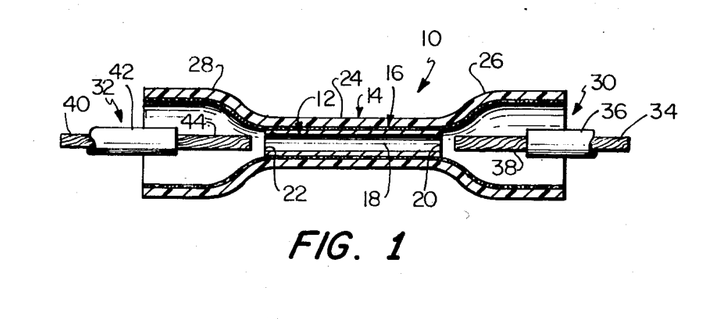
FIG. 1 is a longitudinal sectional side view of an electrical connector in accordance with the present invention in which the central portion of the heat shrinkable plastic tube has already been shrunk and adhered to the metal ferrule and the two electrical conductors are received in the ends of the heat shrinkable plastic tube and are about to be inserted into the metal ferrule.
Figure 2:
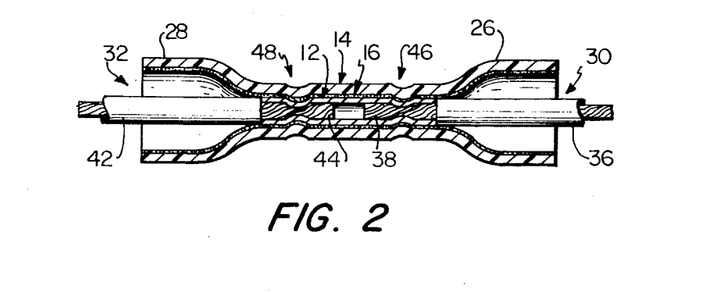
FIG. 2 is a longitudinal sectional side view of the electrical connector shown in FIG. 1 with the leads of the electrical conductors received in the metal ferrule and with the ferrule being crimped in those areas receiving the leads, the insulation of the electrical conductors being received in the portion of the heat shrinkable plastic tube which has yet to be shrunk.
Figure 3:
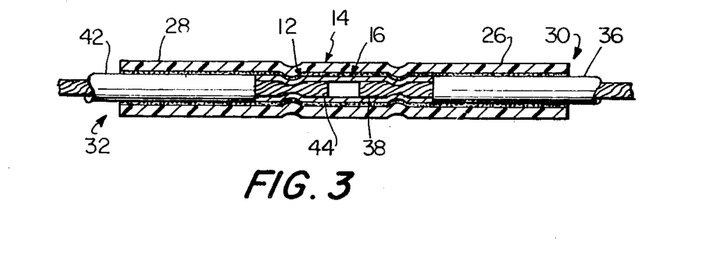
FIG. 3 is a longitudinal sectional side view of the electrical connector shown in FIG. 2 with the ends of the heat shrinkable plastic tubing having been heated and thereby shrunk and hermetically bonded to the insulation on the electrical conductors.

More specifically, as shown in FIGS. 1-3, the electrical connector comprises a metallic, malleable ferrule surrounded by a heat shrinkable plastic tube having normally dry, heat activated adhesive coated on the interior surface of the tube. The central portion of the tube is first heated to thereby shrink and adhere the central portion to the exterior surface of the ferrule and then the two electrical conductors are maneuvered into the ferrule and the connector is crimped in the ferrule area containing the leads of the electrical conductors. The two ends of the tube extending past the ferrule are heated to thereby shrink and hermetically bond these ends to the insulation of the electrical conductors.

Figure 4:
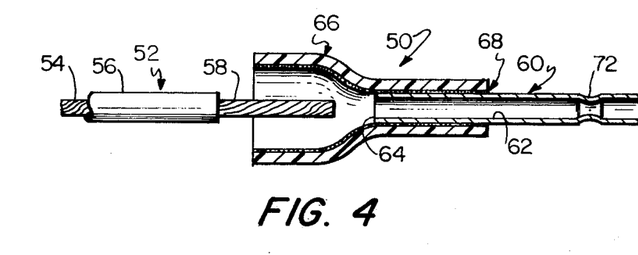
FIG. 4 is a longitudinal sectional side view of an electrical conductor to be used with the electrical connectors shown in FIGS. 7–10 in which a heat shrinkable plastic tube has been adhered to a metallic ferrule and a lead on an electrical wire is about to be inserted into the metal ferrule.
Figure 5:
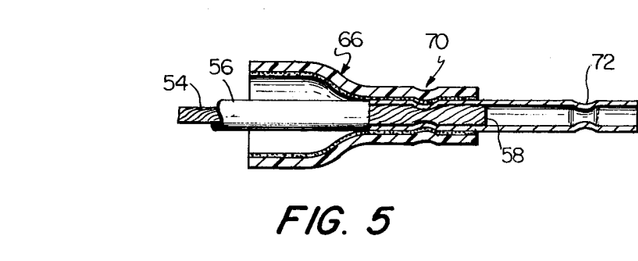
FIG. 5 is a longitudinal sectional side view of the electrical conductor shown in FIG. 4 with the lead having been inserted in the metal ferrule and that ferrule having been crimped in the area receiving the lead, the insulation of the electrical wire being received in the portion of the heat shrinkable plastic tube which has yet to be shrunk.
Figure 6:
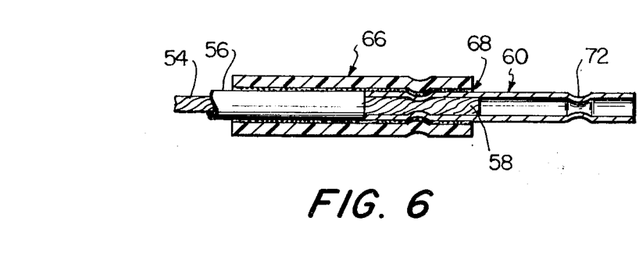
FIG. 6 is a longitudinal sectional side view of the electrical conductor shown in FIG. 5 with the portion of the heat shrinkable plastic tube receiving the insulation of the electrical wire having been heated and thereby shrunk and hermetically bonded to the insulation.

As shown in FIGS. 4-6, an electrical conductor, usable in the electrical connectors shown in FIGS. 7-10, comprises an insulated electrical wire, a ferrule receiving a lead from the wire, and a heat shrinkable plastic tube having a normally dry, heat activated adhesive coated on the interior thereof, which tube is heated and thereby shrunk and hermetically bonded to both the ferrule and the wire insulation.

Figure 7:
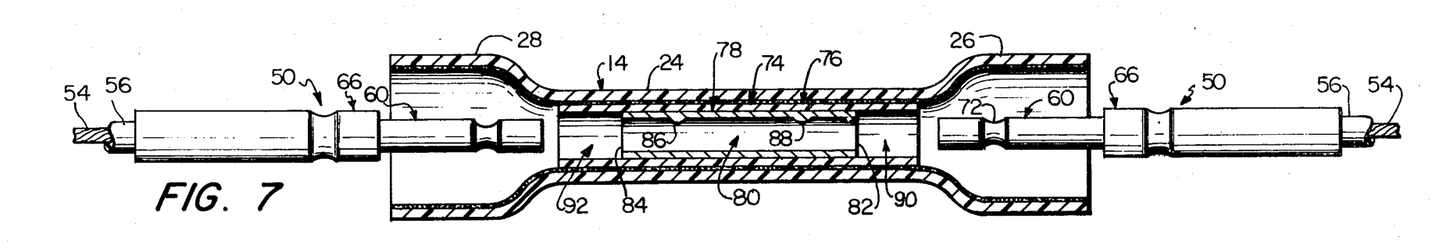
FIG. 7 is a longitudinal sectional side view of a second embodiment of the present invention in which an additional insulating layer is interposed on the exterior of the metal ferrule and two of the electrical conductors shown in FIGS. 4–6 are about to be received in the metal ferrule.
Figure 8:
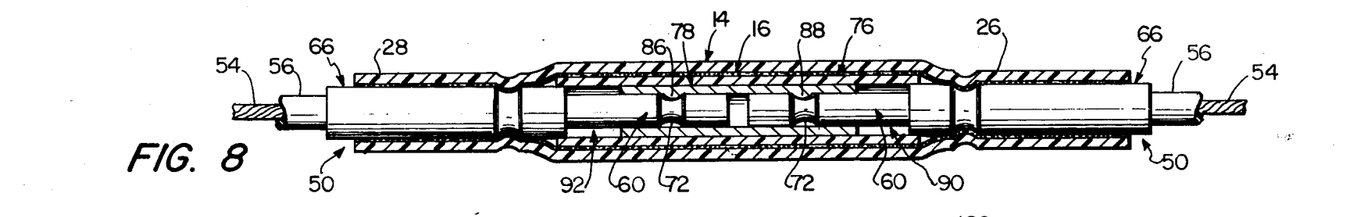
FIG. 8 is a longitudinal sectional side view of the electrical connector shown in FIG. 7 with the electrical conductors received in the metal ferrule and with the ends of the heat shrinkable plastic tube having been heated and thereby shrunk and hermetically bonded to the insulation on the electrical conductors.

As shown in FIGS. 7 and 8, the electrical connector is the same as that shown in FIGS. 1-3 except an insulating layer is interposed on the exterior of the ferrule, the inner diameter of the ferrule is larger for receiving the larger diameter electrical conductor of FIGS. 4-6, and protuberances are provided in the ferrule for releaseably securing the leads of the electrical conductors by reception thereof in the indentations therein.

Figure 9:
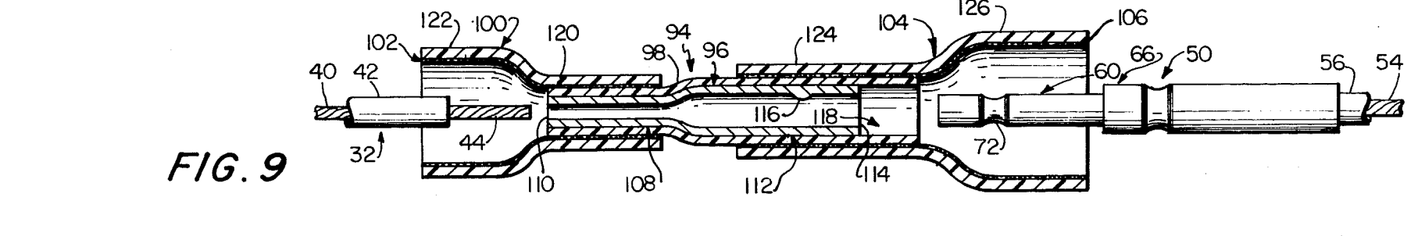
FIG. 9 is a longitudinal sectional side view of a third embodiment of the present invention in which two heat shrinkable plastic tubes are adhered to opposite ends of a metal ferrule and in which one of the ends receives an electrical conductor in the form of a conventional insulated electrical wire and the other end receives the electrical conductor shown in FIGS. 4–6 herein.
Figure 10:
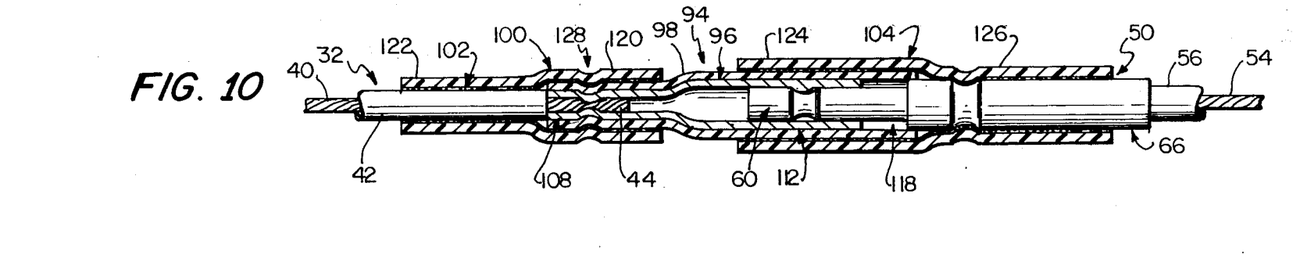
FIG. 10 is a longitudinal sectional side view of the electrical connector shown in FIG. 9 in which the conventional insulated electrical wire has been inserted in one end of the metal ferrule, the ferrule has been crimped and the heat shrinkable plastic tube has been shrunk and hermetically bonded to the insulation of the electrical wire and in which the electrical conductor of FIGS. 4–6 has been inserted in the other end of the metal ferrule and the other heat shrinkable plastic tube has been shrunk and hermetically bonded to the insulation on the electrical conductor.

As shown in FIGS. 9 and 10 the electrical connector has two heat shrinkable plastic tubes received on opposite ends of a ferrule with one of the tubes receiving an electrical conductor which is a conventional insulated electrical wire and the other of the tubes receiving an electrical conductor in accordance with FIGS. 4–6 hereof. The electrical wire is crimped to the ferrule while the electrical conductor shown in FIGS. 4–6 is received by the ferrule by means of the protuberance-indentation releasable connection.

Since the connectors disclosed herein basically comprise a metal ferrule and heat shrinkable plastic tubing having a normally dry, heat activated adhesive coated thereon, the connection is easily and quickly installed without any complicated steps in the sequence of connection. Similarly, the connection has a low profile and is light in weight.

Since the heat activated adhesive on the tubes forms a hermetic bond to the insulation of the connected electrical conductors, this connection is moisture sealed and provides a high degree of strained relief. When necessary, the electrical conductor is crimped in the electrical connector; however, this is accomplished without a special crimping tool. Since the leads of the electrical conductors are received in the metallic ferrule, accurate positioning is assured relative to the insulation provided by the heat shrinkable plastic tubing. In addition, this plastic tubing provides a complete insulation for the connection, and this insulation can be easily reinforced where necessary by adding an extra insulating layer to the metal ferrule between the ferrule and the heat shrinkable plastic tube. Finally, as described in more detail hereinafter, the connections shown in FIGS. 7–10 can be dismantled in a simple manner by notching the heat shrinkable plastic tube, exposing the tube to additional heating to split and shrink it and removing the split tube, and then reassembling the connector with a new tube.

Other objects, advantages and salient features of the present invention will become apparent from the following detailed description, which, taken in conjunction with the annexed drawings, discloses preferred embodiments of the present invention.

DRAWINGS

Referring now to the drawings which form a part of this original disclosure.

DESCRIPTION OF FIGS. 1–3

Referring now to the drawings in further detail, as shown in FIG. 1 the electrical connector 10 in accordance with the present invention comprises a conductive member 12, a heat shrinkable plastic tube 14 and normally dry, heat activated adhesive 16 coated on the interior surface of the tube 14.

The conductive member 12 is formed from a metallic, malleable material, such as copper, and is substantially tubular having a central bore 18 extending completely therethrough such that the conductive member 12 has opposite open ends 20 and 22. While this conductive member 12 is shown as being tubular, it is contemplated that the member can have a solid center part with two opposite blind bores extending from opposite sides or can have a longitudinal slit running from end to end in its wall.

The heat shrinkable plastic or polymeric material forming tube 14 has the property of an elastic memory and as such is dimensionally heat unstable and may be caused to change shape and/or dimension simply by the application of heat. Such elastic memory may be imparted to polymeric materials by first extruding or otherwise molding the polymer into a desired shape. The polymer is then cross linked or given the properties of a cross-linked material by exposure to high energy radiation, e.g., a high energy electron beam, initiation of cross linking by exposure to ultra violet radiation, or by chemical means, e.g., peroxides when polyolefins are used. The cross-linked polymeric material is then heated and deformed to the required shape and/or dimension and then locked in the deformed condition by quenching or other suitable cooling or, in the alternative, the same process can be accomplished at room temperature by using greater force to deform the polymer. In any event, the deformed material will retain its shape almost indefinitely until exposed to a temperature sufficient to cause recovery, e.g., approximately 250° F. in the case of polyethylene. Among the polymers which may be so processed are polyolefins such as polyethylene and polypropylene, polyamides, polyurethanes, polyvinylchloride, polyvinylidenefluoride, copolymers of ethylene and an alkyl acrylate, and elastomeric materials such as elastomeric polyurethanes. The property of elastic memory may also be imparted to materials having the properties of cross-linked polymers such as polytetrafluorethylene and very high molecular weight polyolefins or vinyl polymers such as polyvinylchloride.

The layer of adhesive 16 coated on the interior surface of the heat shrinkable plastic tube 14 should be normally dry at normal room temperatures, but readily rendered tacky upon heating above such temperatures, e.g., by exposure to a lighted match. The adhesive should also lose its tacky quality when the adhesive is cooled. One such adhesive which is suitable is a 10% solution of chlorinated rubber (Tornesite). Another is a 10% solution of cyclised rubber in gasoline. A third adhesive, which is especially suited for use with a heat shrinkable polyvinylchloride tube is the product known commercially as "Casco-Bond SA-5461" which is a synthetic resin solution having a ketone odor when wet and a normal viscosity of 4000–6000 ccs., Brookfield, manufactured by Borden, Inc./Chemical Division, New York, New York.

Referring again to FIG. 1, the heat shrinkable plastic tube 14 is comprised of a central portion 24 extending from one end to the other end of the conductive member 12, a first portion 26 extending from one end of the central portion past an end of the conductive member, and a second portion 28 extending from the other end of the central portion past the other end of the conductive member.

Initially, the inner diameter of the central portion 24 is larger than the outer diameter of the conductive member 12. However, this central portion is coupled to the exterior surface of the conductive member by being heated to a sufficient temperature to thereby shrink the central portion into an engaging relationship with the conductive member exterior surface and to thereby activate the adhesive to hermetically bond the central portion to the conductive member exterior surface. This is the condition shown in FIG. 1 in which relative movement between these members is resisted by the adhesive bond and they are moisture sealed.

As also shown in FIG. 1, a first electrical conductor 30 and a second electrical conductor 32 are about to be inserted into the conductive member 12. The first electrical conductor 30 is a conventional insulated electrical wire formed by a conducting portion 34 surrounded by an insulating portion 36 with the conducting portion having a lead 38 extending past the end of the insulating portion. The conducting portion 34 is made of a plurality of strands of material, such as copper, and the insulating portion 36 is formed from rubber or plastic material engagingly surrounding the conducting portion.

The second electrical conductor 32 is similarly formed and comprises a conducting portion 40, an insulating portion 42 and a lead 44.

Referring now to FIG. 2, the leads 38 and 44 of electrical conductors 30 and 32 have been received in respective opposite ends 20 and 22 of the conductive member 12 so that the end of the insulating portions for each of the electrical conductors directly abuts the ends of the conductive member. In this position, the leads 38 and 44 extend inwardly into the conductive member a distance for each which is slightly less than half the longitudinal length of the conductive member. This is preferably the case; however, the leads could be shortened somewhat as long as they extend somewhat into the conductive member so that they can be crimped, as described in more detail hereinafter, or the leads could each be longer than one half the longitudinal length of the conductive member in which case the end of the insulating portion for the respective electrical conductor would not abut the end of the conductive member. In this latter case however the insulating portion of the electrical conductor should be at least partially received within the first portion 26 or the second portion 28 of the heat shrinkable plastic tube 14. In any event, the positioning shown in FIG. 2 is the most preferable.

Thus, once the leads are received in the conductive members 12, a conventional crimping tool is maneuvered around the outside of the heat shrinkable plastic tube 14 in the area containing the lead 38 and the heat shrinkable plastic tube, the adhesive 16, the conductive member 12 and the lead 38 are all subjected to a crimping operation resulting in the crimp generally shown at 46. A similar crimp generally shown as 48 for lead 44 is additionally accomplished. While the outer diameter of the leads 38 and 44 would most likely be chosen so that they are substantially equal to the inner diameter of the conductive member 12 so that a conducting relationship results between the conductive member and the leads, the crimping operation is deemed desirable in order to assure a conductive relationship therebetween and to add resistance to an axial pull of the electrical conductors relative to the conductive member 12.

Referring now to FIG. 3, the completed electrical connector is shown therein. Initially, the interior diameters of the first portion 26 and the second portion 28 of tube 14 are larger than the outer diameter of the part of the insulating portions 36 and 42 of electrical conductors 30 and 32 received in these portions of the tubes and then are coupled in a sealing relationship with the insulating portions of the respective ones of the electrical conductors. This is accomplished by heating the first and second portions of tube 14 to thereby shrink these portions into an engaging relationship with the insulating portion and to thereby activate the adhesive coated thereon to hermetically bond the first and second portions to the insulating portions of the respective ones of the electrical conductors 30 and 32. By "hermetically bond" it is meant that the connection between these elements provides a moisture seal and prevents relative movement therebetween.

By so forming the electrical connector 10, a moisture proof seal is provided by means of the heat activated adhesive 16 and a highly strain relieved connection results by the coupling of the heat shrinkable plastic tube 14, via the adhesive, to the insulating portions of the electrical conductors and in addition to the conductive member 12. This connector, as clearly shown in FIG. 3, is low in profile and light in weight and is easy to assemble.

DESCRIPTION OF FIGS. 4-6

Referring now to FIG. 4, an electrical conductor 50 is shown which is usable with the electrical connectors to be described hereinafter in FIGS. 7-10. This electrical conductor 50 is for use with a conventional electrical wire 52 formed of a conducting portion 54, a tubular insulating portion 56 surrounding the conducting portion and a lead 58 on the conducting portion extending past an end of the insulating portion. This electrical wire 52 is formed from materials similar to that forming electrical conductors 30 and 32 referred to above.

The electrical conductor 50 comprises a metallic, malleable, tubular ferrule 60 having a central bore 62 and an open end 64, a heat shrinkable plastic tube 66 and normally dry, heat activated adhesive 68 coated on the interior surface of the heat shrinkable plastic tube 66.

The inner diameter of the heat shrinkable plastic tube 66 is initially greater than the outer diameters of both the ferrule 60 and the insulating portion 56 of electrical wire 52.

As shown in FIG. 4, a portion of the ferrule 60 is received in a portion of the tube 66 and that tube has been heated and thereby shrunk into an engaging relationship with the exterior surface of the ferrule and the adhesive coated on the interior surface of the tube has been activated to hermetically bond the tube to the exterior surface of the ferrule.

Referring now to FIG. 5, the electrical wire 52 has been maneuvered so that lead 58 is received via open end 64 into the central bore 62 of the ferrule 60. In the position shown the end of the insulating portion 56 abuts the end of the ferrule 60. In this position, at least a portion of the insulating portion 56 is received within the unshrunk portion of the plastic tube 66 and a crimping operation can be accomplished on lead 58. Thus, a crimp generally designated as 70 is provided by utilizing a conventional crimping tool on the heat shrinkable plastic tube 66, the heat activated adhesive 68, the ferrule 60 and the lead 58. Such a crimp assures excellent conductive contact between the lead and ferrule.

Referring to FIG. 6, the completed electrical conductor 50 is shown in which the portion of the heat shrinkable plastic tube 66 receiving a portion of the insulating portion 56 has now been sealed thereto. This is accomplished by heating the plastic tube in that area to thereby shrink the tube into an engaging relationship with the insulating portion and to thereby activate the adhesive to hermetically bond the plastic tube to the insulating portion.

As shown in FIGS. 4, 5 and 6, the ferrule 60 has a circumferential indentation 72 adjacent an end thereof spaced from the heat shrinkable plastic tube 66, the purpose of which shall be discussed hereinafter.

Referring again to FIG. 6, the electrical conductor 50 is shown in its final, usuable form in which the combination of ferrule 60 and lead 58 provides a lead for the electrical conductor 50 and the combination of the insulating portion 56 and heat shrinkable plastic tube 66 forms a overall insulating portion for the electrical conductor 50.

DESCRIPTION OF FIGS. 7-8

Referring now to FIGS. 7 and 8, a second embodiment of the present invention is shown therein which is similar to that shown in FIGS. 1-3; however, an insulating layer 74 engages the exterior of the ferrule and contacts the adhesive coated on the interior surface of the heat shrinkable plastic tube, and in addition the ferrule has two protuberances extending inwardly from the wall thereof into the central bore. In addition, rather than utilizing the electrical conductors 30 and 32 described above regarding FIGS. 1-3, the electrical conductor 50 described above regarding FIGS. 4-6 is utilized.

In FIGS. 7 and 8, those parts which are shown which are the same as those described regarding FIGS. 1-6 are given the same character numerals for ease of reference, and these parts are essentially the same except that their diameters are slightly larger in order to receive the slightly larger ferrule 60 and heat shrinkable plastic tube 66 discussed above regarding FIGS. 4-6.

Thus, specifically referring to FIG. 7, the conductive member 76 is formed from a metallic ferrule 78 and the insulating layer 74 engaging the exterior of the ferrule 78 and thereby forming the exterior surface thereof.

The ferrule 78 has a central bore 80 and two opposite open ends 82 and 84. Two protuberances 86 and 88 extend inwardly from the interior surface of the wall of the ferrule 78 into the bore 80 and are substantially equally spaced along the length of the bore.

The insulating layer 74 is either frictionally fit over the exterior of the ferrule 78 or is bonded thereto and can be formed on nylon, plastic, rubber, Mylar or insulating tape. This layer also extends past the open ends 82 and 84 of the ferrule 78 forming tubular cavities 90 and 92 at respective ends of the ferrule.

As shown in FIG. 7, first the insulating layer 74 is engaged with the exterior of ferrule 78 and then the heat shrinkable plastic tube 14 central portion 24 is heated to thereby shrink the central portion into an engaging relationship with the insulating layer 74 and to thereby activate the adhesive coated thereon to hermetically bond the heat shrinkable plastic tube to the insulating layer.

As shown in FIG. 7, two electrical conductors 50 are about to be received in ferrule 78. Preferably, the outside diameter of ferrule 60 is substantially equal to the inside diameter of ferrule 78 so that there is a frictional fit therebetween providing a conducting relationship therebetween. Moreover, preferably the length of the exposed part of ferrule 60 is somewhat less than half the length of ferrule 78. In addition, preferably the outside diameter of heat shrinkable tube 66 is slightly less than the inside diameter of cavities 90 and 92 so that tube 66 can be received in each of these cavities. Finally, the inside diameter of portions 26 and 28 of the heat shrinkable plastic tube 14 are initially larger than the outside diameters of the heat shrinkable plastic tubes 66 on the electrical conductors 50 so that tubes 66 are receivable in unshrunk portions 26 and 28.

Referring now to FIG. 8, the two electrical conductors 50 have had their ferrules 60, i.e., their leads, inserted into respective ends 82 and 84 of ferrule 78 a sufficient distance such that protuberances 86 and 88 are received in indentations 72. Thus, there is a conducting relationship between ferrules 60 and the ferrule 78 because of the frictional fit therebetween and also because of the contact of the protuberances with the areas of ferrules 60 adjacent indentations 72. The provision of the protuberances and indentations also provide some additional strain relief to the connection.

In addition to the ferrules 60 being received in ferrule 78, portions of the heat shrinkable plastic tubes 66 on the two electrical conductors 50 are received in the tubular cavities 90 and 92 so that the insulating layer 74 covers that portion of the ferrules 60 extending out of the ferrule 78. It should be pointed out that while there is a space shown in FIG. 8 between the ends of heat shrinkable plastic tubes 66 and the ends 82 and 84 of ferrule 78, the ends of heat shrinkable plastic tubes 66 can abut these ends 82 and 84 of the ferrule 78 is made longer or the ferrules 60 are made shorter.

As shown in FIG. 8, portions 26 and 28 are in a sealing relationship with heat shrinkable plastic tubes 66 on the two electrical conductors 50 thereby completing the formation of the electrical connector. This is accomplished by heating the portions 26 and 28 of the heat shrinkable plastic tube 14 while the heat shrinkable plastic tubes 66 are received in these portions to thereby shrink these portions into an engaging relationship with the exterior ssurfaces of tubes 66 and to thereby activate the adhesive coated on the interior surfaces of these portions to hermetically bond these portions to respective ones of the heat shrinkable plastic tubes 66.

Because of the use of the electrical conductors 50 shown and described above regarding FIGS. 4-6, the electrical connectors shown in FIGS. 7 and 8 can be reused. That is, the connection formed between the two electrical conductors 50 and the ferrule 78 can be disconnected and then reconnected. This is accomplished by initially providing a longitudinal notch along the central portion 24 of the heat shrinkable plastic tube 14 and then reheating the tube. This reheating causes a further shrinking of the tube resulting in an extension of the initial notching thereof into a complete longitudinal slit of the wall of the heat shrinkable plastic tube 14 from one end to the other. Such heating also causes the heat activated adhesive to become fluid, thereby lubricating the movement of the tube 14 as it splits itself apart by further shrinking. Once the tube 14 is completely split it can be removed from the connection thereof with the insulating layer 74 and heat shrinkable tubes 66 on electrical conductors 50. Then these electrical conductors 50 can be removed from the ferrule 78 which allows for components or parts at the other end of conductors 50 to be separated or changed.

In order to reconnect the electrical conductors 50, a new heat shrinkable plastic tube coated on the interior thereof with normally dry, heat activated adhesive is maneuvered over the insulating layer 74 with two ends extending outwardly therefrom and the operation described above regarding FIGS. 7 and 8 is repeated.

Since an additional insulating layer 74 is utilized in this embodiment, high insulation is provided and, if this embodiment is crimped, it will withstand potential insulation loss due to possible cutting by the crimping tool. This insulating layer 74 can also be utilized in the FIGS. 1-3 embodiment in which conductors 30 and 32 are connected.

DESCRIPTION OF FIGS. 9 and 10

Referring now to FIGS. 9 and 10, a third embodiment of the present invention is shown in which a ferrule has an insulating layer engaging the outer surface thereof and two separate heat shrinkable plastic tubes are coupled to the ferrule so that the electrical connector formed thereby can receive an electrical conductor in the form of a conventional insulated electrical wire at one end and an electrical conductor such as that disclosed above in FIGS. 4-6 on the other end. Moreover, that portion of the electrical connector receiving the electrical conductor of FIGS. 4-6 can easily have the electrical conductor removed therefrom and replaced as desired.

Referring specifically to FIG. 9, there is shown therein a conductive member 94 comprised of a ferrule 96 and an insulating layer 98, a first heat shrinkable plastic tube 100 having a normally dry, heat activated adhesive 102 coated on the interior surface thereof, and a second heat shrinkable plastic tube 104 coated on the interior surface thereof by a normally dry, heat activated adhesive 106.

The ferrule 96 is formed of malleable metal and comprises a first part 108 having an open end 110 and a second part 112 with an open end 114, the ferrule having a hollow interior and a protuberance 116 extending inwardly from the wall of the second part 112 adjacent the open end 114. As shown in FIG. 9, the inner diameter and the outer diameter of the second part 112 is larger than the respective inner and outer diameters of the first part 108.

The insulating layer 98 is formed from the same material as that described above regarding FIGS. 7 and 8 and is in an engaging relationship with the exterior of ferrule 96, thereby forming the exterior surface thereof, and extending past the open end 114 of the second part 112 forming a tubular cavity 118.

The first heat shrinkable plastic tube 100 has a base portion 120 and a tubular portion 122. The base portion 120 initially has an inner diameter larger than the outer diameter of that portion of the insulating layer 98 surrounding first part 108 of the ferrule 96 but has been heated so as to be in a sealing relationship with the insulating layer. This is accomplished on such heating by shrinking of the base portion 120 into an engaging relationship with the insulating layer 98 and by activating the heat activated adhesive to hermetically bond the base portion 120 to the insulating layer 98.

Similarly, the second heat shrinkable plastic tube 104 is comprised of a base portion 124 and a tubular portion 126. The base portion 124 initially has an inner diameter larger than the insulating layer 98 covering the second part 112 of ferrule 96 but has been heated to thereby shrink the base portion 124 into an engaging relationship with the insulating layer 98 and to thereby activate the adhesive thereon to hermetically bond the base portion 124 to the insulating layer 98.

As seen in FIG. 9, the tubular portion 122 of the first tube 100 extends past open end 110 of ferrule 96 and initially has an inner diameter greater than the outer diameter of the insulating portion 42 on the electrical conductor 32 having a conducting portion 40 and a lead 44.

Similarly, the inner diameter of the tubular portion 126 of the second tube 104 initially is larger than the outer diameter of heat shrinkable plastic tube 66 on the electrical conductor 50 having a lead in the form of ferrule 60.

Referring now to FIG. 10, electrical conductor 32 has been maneuvered so that lead 44 is passed through open end 110 in ferrule 96 and is received therein in a conducting relationship with the end of insulating portion 42 abutting the end of ferrule 96. Furthermore, a crimping operation has taken place forming a crimp generally designated as 128 by utilizing a conventional crimping tool on base portion 120, adhesive 102, insulating layer 98, the first part 108 of ferrule 96 and lead 44. Moreover, the tubular portion 122 has been heated to provide a sealing connection with insulating portion 42 of electrical conductor 32. That is, the tubular portion 122 has been heated to thereby shrink that portion into an engaging relationship with the exterior surface of insulating portion 42 and to thereby activate the adhesive thereon to hermetically bond the tubular portion 122 to insulating portion 32.

In addition, ferrule 60 on electrical conductor 50 has been inserted in open end 114 of the second part 112 of ferrule 96 so that protuberance 116 is received in indentation 72 in the ferrule 60. By so maneuvering ferrule 60 into ferrule 96 there is a conducting relationship therebetween.

Moreover, as shown in FIG. 10 a portion of the heat shrinkable plastic tube 66 on electrical conductor 50 is received in tubular cavity 118 so that the insulating layer 98 protects any part of ferrule 60 extending out of ferrule 96. Although the end of heat shrinkable plastic tube 66 is not shown in FIG. 10 abutting the end of ferrule 96, this can be done if desired, with a concomitant movement of protuberance 116 further inward along ferrule 96 or movement of indentation 72 toward heat shrinkable plastic tube 66.

Finally, as shown in FIG. 10, the tubular portion 126 of the second heat shrinkable plastic tube 104 has been heated so that it is in a sealing relationship with heat shrinkable plastic tube 66. That is, tubular portion 126 is heated to thereby shrink this portion into an engaging relationship with the heat shrinkable plastic tube 66 and to thereby activate the adhesive thereon to hermetically bond the interior of the tubular portion 126 to the exterior surface of tube 66.

In this fashion, a reliable, low profile, lightweight, moisture sealed and strain relieved electrical connector is formed.

Although a reliable connection is so formed, electrical conductor 50 can be removed from the connector by longitudinally notching the exterior of heat shrinkable plastic tube 104 and reheating that tube. This results in a slit being formed in the wall of tube 104 which propagates itself until it extends from one end of the tube to the other. This reheating also renders the heat activated adhesive fluid so as to lubricate the additional shrinking of the tube 104. After the slit is complete the tube 104 is removed from the insulating layer 98 and the heat shrinkable plastic tube 66. Since tube 66 had been received in the insulating layer 98, i.e., in cavity 118, none of the adhesive on tube 104 has contaminated ferrule 60. Thus, electrical conductor 50 can be removed, inspected and replaced or a different conductor 50 can be replaced in ferrule 96 via open end 114 and a new heat shrinkable plastic tube, similar to tube 104, can be maneuvered thereon and heated to rebond the electrical conductor to the insulating layer 98. Of course, in order to accomplish this, the new tube should be placed either over the electrical conductor or the insulating layer first since it is a continuous tube.

While various embodiments have been chosen to illustrate the invention, it will be understood by those skilled in the art that various changes and modifications can be made therein without departing from the scope of the invention as defined in the appended claims.

What is claimed is:

1. A device for connecting first and second insulated electrical conductors, each of the conductors including a conducting portion surrounded by an insulating portion with the conducting portion having a lead extending past the end of the insulating portion, comprising:
   an open-ended conductive member, having an exterior surface, for at least partially receiving the leads in a conducting relationship with said conductive member; and
   means, coupled to said conductive member exterior surface, for securing the insulated conductors to said conductive member,
   said means comprising a first heat shrinkable plastic tubular portion extending past one end of said conductive member for receiving therein a part of the insulating portion of the first electrical conductor, and normally dry, heat activatable adhesive coated on the entire interior surface of said first tubular portion,
   said means further comprising a second heat shrinkable plastic tubular portion extending past the other end of said conductive member for receiving therein a part of the insulating portion of the second electrical conductor, and normally dry, heat activatable adhesive coated on the entire interior surface of said second tubular portion,
   each of said tubular portions having an inner diameter greater than the outer diameter of the part of the insulating portion to be received therein and being capable of being coupled in a sealing relationship with the insulating portion of a respective one of the electrical conductors by heating said tubular portion to thereby shrink said tubular portion into an engaging relationship with the insulating portion and to thereby activate said adhesive coated thereon to hermetically bond the tubular portion to the insulating portion,
   said means further comprises a central heat shrinkable plastic tubular portion integrally formed with and between said first and second heat shrinkable plastic tubular portions, and having a normally dry, heat activatable adhesive coated on the entire interior surface thereof,
   said central portion surrounding said conductive member and being coupled to said conductive member exterior surface by being heat shrunk into an engaging relationship with said conductive member exterior surface and by being hermetically bonded to said conductive member exterior surface by said adhesive.

2. A device according to claim 1, wherein said conductive member comprises a metallic, malleable ferrule which can be crimped in those portions which are for containing the leads.

3. A device according to claim 1, wherein said conductive member comprises a metallic ferrule and an insulating layer engaging the exterior of said ferrule forming said exterior surface thereof.

4. A device according to claim 3, wherein said insulating layer extends past at least one of the ends of said ferrule for receiving therein a portion of the insulating portion of one of the electrical conductors.

5. A device according to claim 1, wherein said conductive member has at least one protuberance extending inwardly into at least one of said open-ends for releasably engaging a complimentary indentation in a lead to releasably secure the lead to said conductive member.

6. A device for connecting first and second insulated electrical conductors, each of the conductors including a conducting portion surrounded by an insulating portion with the conducting portion having a lead extending past the end of the insulating portion, comprising:
   an open-ended conductive member, having an exterior surface, for at least partially receiving the leads in a conducting relationship with said conductive member; and
   means, coupled to said conductive member exterior surface, for securing the insulated conductors to said conductive member,
   said means comprising a first heat shrinkable plastic tubular portion extending past one end of said conductive member for receiving therein a part of the insulating portion of the first electrical conductor, and normally dry, heat activatable adhesive coated on the entire interior surface of said first tubular portion,
   said means further comprising a second heat shrinkable plastic tubular portion extending past the other end of said conductive member for receiving therein a part of the insulating portion of the second electrical conductor, and normally dry, heat activatable adhesive coated on the entire interior surface of said second tubular portion,
   each of said tubular portions having an inner diameter greater than the outer diameter of the part of the insulating portion to be received therein and being capable of being coupled in a sealing relationship with the insulating portion of a respective one of the electrical conductors by heating said tubular portion to thereby shrink said tubular portion into an engaging relationship with the insulating portion and to thereby activate said adhesive coated thereon to hermetically bond the tubular portion to the insulating portion,
   said conductive member comprising a metallic, malleable ferrule and an insulating layer coupled to the exterior of said ferrule forming said exterior surface thereof,
   said means further comprising a first base heat shrinkable tubular portion integrally formed with said first tubular portion and surrounding a portion of said conductive member, and normally dry, heat activatable adhesive coated on the interior surface of said first base tubular portion,
   said first base tubular portion being coupled to said conductive member exterior surface by being heat shrunk into an engaging relationship with said conductive member exterior surface and by being hermetically bonded to said conductive member exterior surface by said adhesive,
   said means further comprising a second base heat shrinkable tubular portion integrally formed with said second tubular portion and surrounding a portion of said conductive member, and normally dry, heat activatable adhesive coated on the interior surface of said second base tubular portion,
   said second base tubular portion being coupled to said conductive member exterior surface by being heat shrunk into an engaging relationship with said conductive member exterior surface and by being hermetically bonded to said conductive member exterior surface by said adhesive.

7. A device according to claim 6, wherein said ferrule has an outer diameter in the portion in which it is surrounded by said first base tubular portion which is larger than the outer diameter in the portion in which it is surrounded by said second base tubular portion.

8. A method of connecting two electrical conductors, each of the conductors including a conducting portion surrounded by an insulating portion with the conducting portion having a lead extending past the end of the insulating portion, comprising the steps of
   interposing an open-ended tubular conductive member inside a heat shrinkable plastic tube having a normally dry, heat activatable adhesive coated on the interior surface thereof so that first and second ends of the plastic tube extend past the ends of the conductive member,
   heating the portion of the plastic tube between the ends of the conductive member so that the plastic tube shrinks into an engaging relationship with the exterior surface of the conductive member and so that the adhesive is activated to hermetically bond the plastic tube to the conductive member,
   extending the leads of the two electrical conductors into the opposite open ends of the conductive member in a conducting relationship, and
   heating the first and second ends of the plastic tube so that the ends shrink into an engaging relationship with the insulating portions of respective ones of the electrical conductors and so that the adhesive is activated to hermetically bond the plastic tube ends to the insulating portions.

9. A method according to claim 1, wherein
   the interposing step is preceded by the step of covering the conductive member with an insulating layer constituting the exterior surface thereof.

10. A method according to claim 8, wherein
    the second heating step is preceded by the step of crimping the conductive member in the areas thereof in which the leads are located.

11. A method of connecting two electrical conductors, each of the conductors including a conducting portion surrounded by an insulating portion with the conducting portion having a lead extending past the end of the insulating portion, comprising the steps of
    covering the exterior of an open-ended tubular conductive member with an insulating layer,
    interposing one end of the conductive member into a portion of a first heat shrinkable plastic tube having a normally dry, heat activatable adhesive coated on the interior surface thereof,
    heating the portion of the first tube receiving the end of the conductive member so that portion of the tube shrinks into an engaging relationship with the insulating layer thereon and so that the adhesive therein is activated to hermetically bond the first plastic tube to the insulating layer,
    interposing the other end of the conductive member into a portion of a second heat shrinkable plastic tube having a normally dry, heat activatable adhesive coated on the interior surface thereof,
    heating the portion of the second tube receiving the other end of the conductive member so that portion of the second tube shrinks into an engaging relationship with the insulating layer thereon and so that the adhesive therein is activated to hermetically bond the second plastic tube to the insulating layer,
    extending the leads of the two electrical conductors into the opposite open ends of the conductive member in a conducting relationship so that portions of the insulating portions of the electrical wires are received respectively in those portions of the first and second tubes vacant by the conductive member, and heating those portions of the first and second tubes receiving the insulating portions so that these portions shrink into engaging relationships with respective ones of the conductors' insulating portions and so that the adhesive therein is activated to hermetically bond the first tube to the insulating portion of one of the conductors and the second tube to the insulating portion of the other conductor.

12. A method of forming an electrical conductor for an electrical wire having a conducting portion surrounded by an insulating portion with the conducting portion having a lead extending past the end of the insulating portion, comprising the steps of extending an open end of a conductive member into a portion of a heat shrinkable plastic tube having a normally dry, heat activatable adhesive coated on the interior surface thereof, heating the portion of the tube receiving the conductive member so that this portion shrinks into an engaging relationship with the exterior surface of the conductive member and so that the adhesive therein is activated to hermetically bond this portion to the exterior surface of the conductive member, extending the lead on the electrical wire into the open end of the conductive member so that the portion of the plastic tube vacant by the conductive member surrounds a portion of the electrical wire insulating portion, crimping the conductive member in the area containing the lead, and heating that portion of the plastic tube surrounding the electrical wire insulating portion so that that portion of the plastic tube shrinks into an engaging relationship with the insulating portion and so that the adhesive therein is activated to hermetically bond that portion of the plastic tube to the insulating portion.

13. An insulated electrical connector for connecting two electrical conductors, each conductor including a continuous conducting portion and insulation surrounding the conducting portion except for an exposed end of the conducting portion, comprising:

a metallic, malleable ferrule having open ends for receiving, respectively, the exposed ends of the two conductors;

a cylindrical tube of uniform wall thickness formed of heat shrinkable plastic and having open ends for respectively receiving the insulation on the conductors adjacent the exposed ends;

normally dry, heat activatable adhesive coated on the entire interior surface of said tube; and said ferrule being adhesively secured in substantially the middle of said tube against longitudinal movement by radial reduction of said tube and activation of said adhesive by heating the middle of the tube surrounding said ferrule, the exposed ends being connectable to said ferrule by mechanical deformation of said ferrule by crimping, the insulation on the conductors being securable and hermetically bondable to said tube by reduction of said tube ends and activation of said adhesive by heating the tube at the ends thereof.

14. An insulated electrical connector according to claim 13, and further including a substantially cylindrical insulating layer interposed between said ferrule and said tube interior surface.

15. An electrical conductor for an electrical wire including a conducting portion, a tubular insulating portion surrounding the conducting portion, the conducting portion having an exposed end extending past an end of the insulating portion, comprising:

a metallic, malleable ferrule having an open end for receiving the exposed end of the conducting portion on the conductor;

a cylindrical tube of uniform wall thickness formed of heat shrinkable plastic and having open ends for respectively receiving the insulating portion on the conductor and said ferrule;

normally dry, heat activatable adhesive coated on the entire interior surface of said tube; and said ferrule being adhesively secured in one end of said tube against longitudinal movement by radial reduction of one end of said tube and activation of said adhesive by heating said one end of said tube surrounding said ferrule, the exposed end on the conductor being connectable to said ferrule by mechanical deformation of said ferrule by crimping, the insulating portion on the conductor being securable and hermetically bondable to said tube by reduction of said tube other end receiving the insulating portion and activation of said adhesive by heating said tube at said other end.

* * * * *

UNITED STATES PATENT AND TRADEMARK OFFICE
CERTIFICATE OF CORRECTION

PATENT NO.  : 4,151,364
DATED       : April 24, 1979
INVENTOR(S) : J. Scott Ellis It is certified that error appears in the above-identified patent and that said Letters Patent are hereby corrected as shown below:

Claim 9, line 1, "claim 1" should read -- claim 8 --.

Signed and Sealed this

Seventeenth Day of July 1979

[SEAL]

Attest:

Attesting Officer

LUTRELLE F. PARKER
Acting Commissioner of Patents and Trademarks